Figure 1:
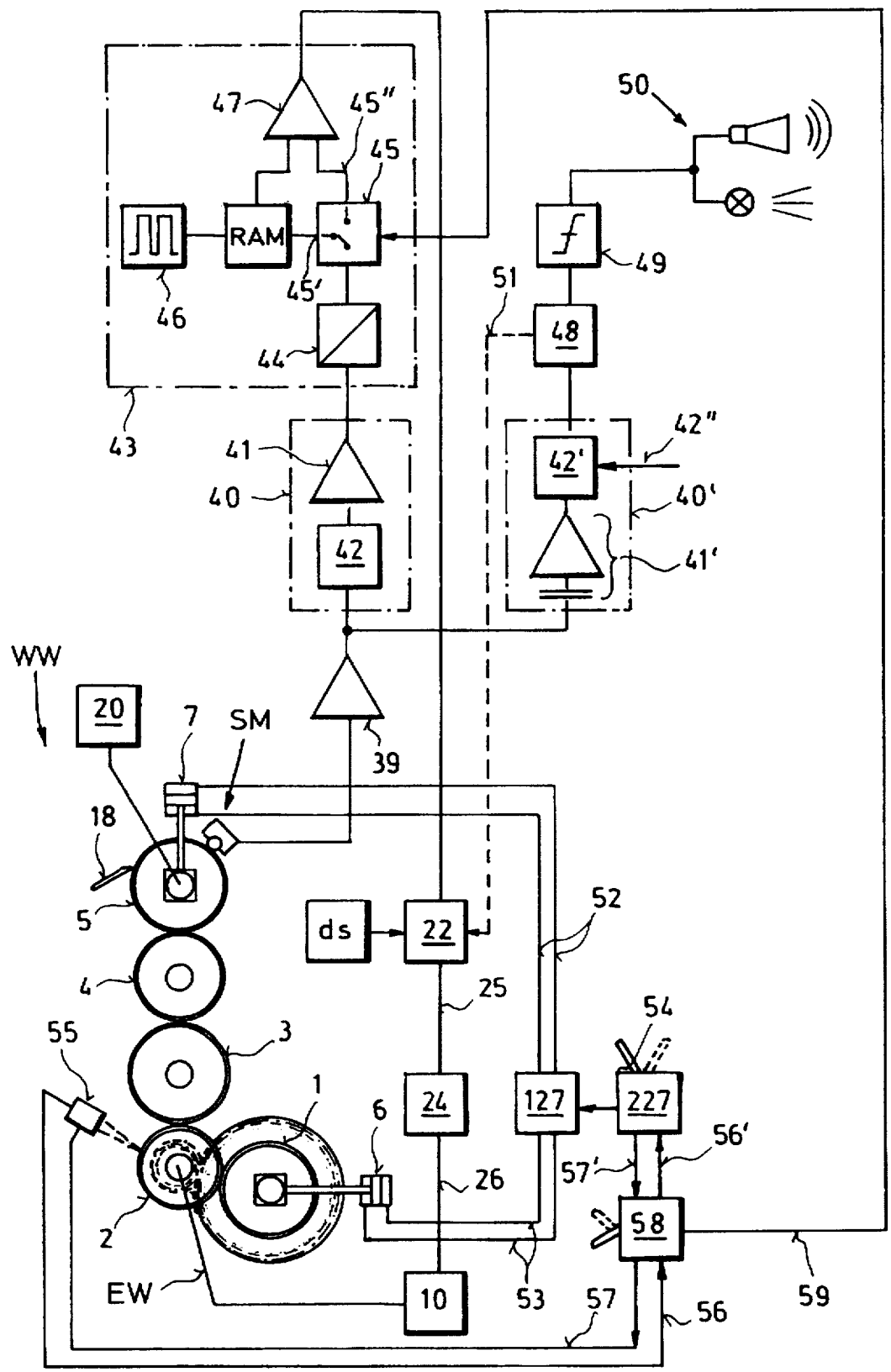

United States Patent [19]

Greminger et al.

[11] Patent Number: 5,747,675
[45] Date of Patent: May 5, 1998

[54] METHOD FOR MEASURING THE THICKNESS OF A LAYER AND APPARATUS FOR CARRYING OUT THE METHOD

[75] Inventors: Hansueli Greminger, Niederuzwil; Niklaus Schoenenberger, Herisau, both of Switzerland

[73] Assignee: Bühler AG, Uzwil, Switzerland

[21] Appl. No.: 617,263

[22] Filed: Mar. 18, 1996

Related U.S. Application Data

[63] Continuation of Ser. No. 256,001, filed as PCT/CH93/00238 Oct. 6, 1993, Pat. No. 5,561,251.

[30] Foreign Application Priority Data

Oct. 30, 1992 [CH] Switzerland ............... 3386/92

[51] Int. Cl.⁶ .................................................. B23Q 17/09
[52] U.S. Cl. ................................................................ 73/104
[58] Field of Search ............................ 73/169, 865.8, 73/104, 105; 33/832, 833, 836, 501.02–501.04, 835

[56] References Cited

U.S. PATENT DOCUMENTS

| | | |
|---|---|---|
| 2,224,728 | 12/1940 | Gulliksen . |
| 3,372,878 | 3/1968 | Verdier . |
| 3,525,929 | 8/1970 | Mounce . |
| 3,866,115 | 2/1975 | Lewis . |
| 4,746,070 | 5/1988 | Kuster . |
| 4,778,167 | 10/1988 | Snow et al. . |
| 5,284,670 | 2/1994 | Hayashi . |

FOREIGN PATENT DOCUMENTS

| | | |
|---|---|---|
| 3016785 | 12/1981 | Germany . |
| 3153304 | 3/1983 | Germany . |
| 3634715 | 6/1987 | Germany . |
| 3942697 | 7/1990 | Germany . |
| 2084735 | 4/1982 | United Kingdom . |

*Primary Examiner*—Robert Raevis
*Attorney, Agent, or Firm*—Martin A. Farber

[57] ABSTRACT

A method for measuring the thickness of a layer of pasty or dough-like material on a moving surface (5) wherein a movably supported measuring roll is contacted with the layer and wherein during the movement of the surface provided with the layer the deflection of the measuring roll crosswise to the moving direction of the surface is detected with a sensor generating an output signal, whereat a parameter of this output signal is in a functional relationship with the magnitude of the deflection of the measuring roll, or of the thickness of the layer, respectively. To maintain the accuracy and to prevent the coiling up of the layer to be measured on the measuring roll, a defined braking force is exerted thereon.

5 Claims, 2 Drawing Sheets

METHOD FOR MEASURING THE THICKNESS OF A LAYER AND APPARATUS FOR CARRYING OUT THE METHOD

RELATED APPLICATION

This application is a continuation of our application Ser. No. 08/256,001 filed Jun. 13, 1994, which is the USA national phase of PCT/CH93/00238 filed Oct. 6, 1993, now U.S. Pat. No. 5,561,251.

The invention relates to a method for measuring the thickness of a layer of pasty or dough-like ground material on a moving surface and to an apparatus for measuring the thickness of a layer for carrying out the method.

It is an object of the invention to provide a method that is easy to carry out, allowing to determine the thickness of a layer of ground material without the grinding process being influenced, e.g. in a roller mill. To steadily obtain a product of a uniformly high quality, the working process, and within that process particularly the grinding of the pasty chocolate raw material, has to be carried out under predetermined and controlled conditions, with the determination of the thickness of a layer on a grinding surface, such as on a roller of the roller mill, representing an optimum criterium for quality ensurance.

Another object of the invention is to provide an apparatus for measuring the thickness of a layer, with the help of which the method can be carried out in a simple, fast and economical way.

In solving this problem, a first step resides in the recognition of the particular characteristics of pasty or doughlike material, which has the tendency to distribute on two rotational bodies pressed against each other over their surfaces. Now, a mechanical sensor must be pressed against the layer to be measured with a determined pressure to secure a predetermined bearing force of the sensor. But this must then necessarily result in that the roll, which is attached to the sensor, by way of example, and which engages the layer, rotates at about the speed of the surface carrying the ground material, that is to say, at about the circumferential speed of the roller of a roller mill carrying the ground material, whereat it is inevitable that a certain layer of ground material will build up on the measuring roll, which then falsifies the measuring result. Therefore, in a second step on the way to the invention, the task has to be solved how this detrimental phenomenon or this condition can be prevented.

According to the invention, there is suggested a method for measuring the thickness of a layer of pasty or dough-like material on a moving surface against which surface a movably supported measuring roll is contacted so that during the movement of the surface provided with the layer the deflection of the measuring roll crosswise to the moving direction of the surface is detected by a sensor generating an output signal, whereat one parameter of this output signal is in a functional relationship with the magnitude of the deflection of the measuring roll, or of the thickness of the layer, respectively.

By this surprisingly simple measure that effect will be avoided which so far has prevented the use of such apparatus for measuring the thickness of a layer in practice, i.e., the effect of the coiling up of the layer on the measuring roll. This solution is surprising because one would expect the layer to build up in front of the measuring roll, even more resulting in a falsification of the measuring results. However, practical tests have shown that such a fear is not justified, but that rather with such a measure a high measuring accuracy can be achieved while employing a most simple and cost-saving construction.

In principle, the braking could be achieved by the use of a frictional force. However, it has been found out that it is advantageous to assign a predetermined value to the braking force, which mostly cannot be achieved with mere friction, because the frictional force changes too strongly with the temperature, the humidity, etc. According to a further characteristic of the invention, the braking can be achieved to a predetermined extent also by having the measuring roll driven by a motor at a lower speed than the provision of the speed of motion of the layer or the surface. By the motor drive of the measuring roll, a predetermined speed of rotation adapted to the speed of motion of the layer can very easily be adjusted.

Another problem related to the precondition of the measuring accuracy is the problem of zero point adjustment, i.e. of the reference plane from which the thickness of the layer is to be measured. In a further modification of the invention it is therefore suggested that the output signal of the sensor is stored prior to the presence or the formation of the layer on the moving surface, and that it is compared at least periodically against the previously stored signal during the presence of the layer. After that, the comparison result can be referred to for at least one of the following steps: control of the speed of motion of the surface carrying the layer, control of the feed rate of the ground material, control of the pressure, the temperature, the viscosity of the ground material, protection against dry-running of the rollers and/or for indication of the thickness of the layer.

Moreover, it is suggested in a further modification of the invention that two measuring rolls, preferably also being movable crosswise to the moving direction of the surface, such as the cylindrical surface of a roller of a roller mill, e.g. against a spring force, are provided, to which there is assigned an electronic sensor detecting their movements and/or positions at least with respect to their height over the roller.

If, according to a further characteristic of the invention, each measuring roll is coupled for common rotation to a generator, and its braking moment inductively generated is referred to for velocity-dependent braking of the measuring roll, then an automatic control of the braking force can be accomplished in a most simple way, which in turn keeps the constructional expenses low, and, in addition makes possible an almost maintenance-free operation.

Particularly good, i.e. precise, measuring results are achieved, if according to a preferred embodiment of the invention the ratio of the width of the circumferential surface of each measuring roll at the bearing surface on the layer or on the roller to its diameter is chosen greater than 1:5, in particular smaller than 1:10. For thereby, the tendency of the layer to coil up on the measuring roll will also be counteracted.

In a further modification of the invention it is suggested that the output signal of the sensor is fed to an evaluation stage via a filter and amplifier arrangement, which evaluation state comprises a change-over stage for selectively feeding the amplified and filtered signal derived from the sensor to a memory unit or to a comparison unit to which, on the one hand, there is fed the signal readable off from the memory unit and, on the other hand, the current in time signal derived from the output signal of the sensor; that an input of a control device for at least one parameter is connected to the output of the comparison unit for controlling the roller mill; and that a selector switch is provided, which is provided for actuating the change-over unit in dependency upon the operating state of the roller mill, such as normal operation, or starting or run-down operation. Thus, apart from the high measuring accuracy, also the requirement of the zero point adjustment will be reliably met with low expenses for machinery. The term "memory unit" is to be referred to any switching unit or device that is capable of recording or reproducing a particular value representing the zero point.

Inaccuracies of the measuring result caused by the eccentricity of the roller itself, or by unevennesses of the surface carrying the layer can be prevented by applying the output signal of the sensor at least indirectly to a change-over unit via a low-pass filter for the reduction or elimination of wavinesses produced by these eccentricities of the roller.

Figure 2:
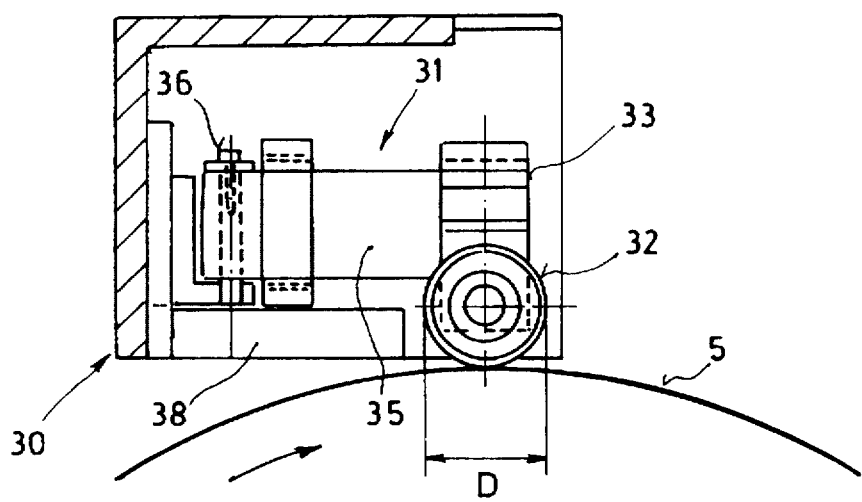
Figure 3:
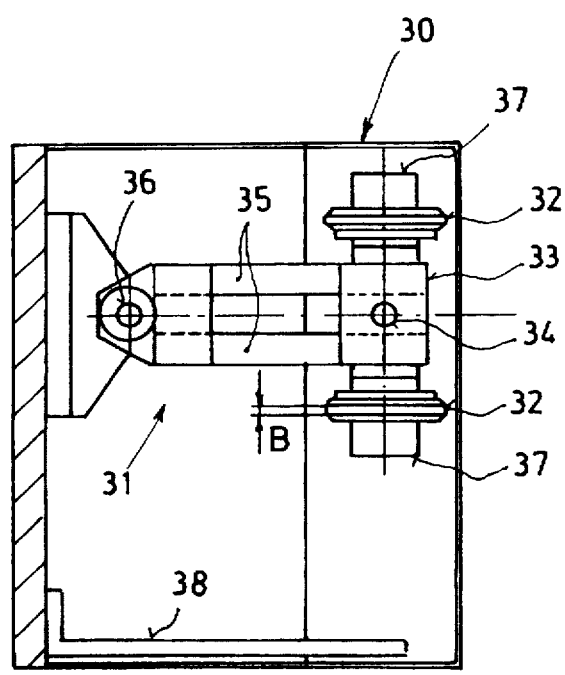

Further details of the invention are revealed by the following description of the embodiment schematically illustrated in the drawings as follows:

FIG. 1 shows a circuit diagram of an apparatus for measuring the thickness of a layer provided by the invention, which is preferably used for controlling a roller mill;

FIG. 2 (represents) an enlarged cross-section with respect to FIG. 1 through the casing of an apparatus for measuring the thickness of a layer, of which FIG. 3 shows a bottom view.

On a roller mill WW designed substantially according to DE-C-31 53 304, corresponding to U.S. Pat. No. 4,746,070 the content of which is incorporated by reference in its entirety herein, there is provided a measuring device SM for measuring the thickness of a layer. It comprises a measuring roll engaging the layer lying on the uppermost roller, whose distance from the roller is determined via an induction coil as a sensor.

FIGS. 2 and 3 illustrate the details of this device SM for measuring the thickness of a layer, whereat, in this case, a lever-like carrier 31 is arranged within a casing 30 centrally between two measuring rolls 32. In principle, instead of a centrical arrangement of the carrier 31, there could also be provided a forked carrier which supports between its fork arms a single measuring roll, designed also wider, if necessary. However, on the free end of the carrying arrangement 31 there is provided a sensor casing 33 within which is arranged a sensor 34 (induction coil, but, if necessary, also a condenser plate) measuring out from an opening of a casing. Thereby, a symmetrical design of sensor 34 and measuring roll 32 will be given.

The carrying arrangement 31 conveniently comprises spring arms 35 allowing an easy deflection for positioning the measuring rolls 32 in the situation wherein the casing 30 might not be mounted in such manner as to place a common axis of alignment with the respective roller 5. A further measure, taken cumulatively or alternatively to the automatic correction of tolerances during the assembly of the casing 30, consists in the carrying arrangement 31 being pivotable about an axis 36 situated crosswise to the running direction of the roller 5.

In addition, the spring arms 35 can be designed in such a manner that the rolls 32 are pressed resiliently against the surface of the roller 5 and are capable of yielding elastically. If desired, there can also be provided a cardanic suspension of the carrying arrangement 31.

It has been mentioned already at the beginning that the measuring accuracy achieved by prevention of the formation of a layer on the measuring rolls 32 can be improved by holding their peripheral velocity smaller than that of the roller 5 taking them along by frictional contact. It is true that a slip loss may result from natural causes, but it will not be sufficient to prevent the formation of a layer of the pasty or dough-like ground material present from the roller 5 on the circumference of the respective measuring rolls 32. Therefore, a brake device 37 is assigned to the respective measuring roll 32. This can be a friction brake per se, but it is more reliable if a better defined braking force is exerted, which is optionally dependent upon the velocity of the respective roller 5. For this purpose, the brake devices 37 are designed in the manner of a generator, i.e., a braking is provided by the generation of induction currents in the brake devices 37. Alternatively, it would also be conceivable to have the measuring rolls 32 driven by motors which impart a lower speed to the measuring rolls 32 than corresponds to the circumferential speed of the roller 5.

A further measure requiring the prevention of adherences of the material to be ground consists in that the measuring rolls 32 are designed relatively narrow, i.e. the ratio of the width B of the peripheral surface contacting the layer on the roller 5 to its diameter D is smaller than 1:5, in particular smaller than 1:10. However, one would assume that there might exist the risk of so thin measuring rolls that they cut in the layer on the roller, and, along with it, the risk of a measuring inaccuracy. On the contrary, it has, however, surprisingly been found that this measure—in particular in connection with the braking via the brake devices rather results in a sort of "self-cleaning effect" of the surfaces of these rolls 32. The The signals of the sensor 34 are led along the carrying arrangement 32 approximately up to the axis of revolution 36, and then along a casing wall to a cable bearer 38, from where the signals reach the outside. According to FIG. 1, the signals are then fed to a preamplifier 39 whose output is connected to an amplifying and filtering arrangement 40. The arrangement 40 may comprise, by way of example, an amplifier 41 and a low-pass filter 42 (if required, also in the reverse order), with the low-pass filter serving to filter out wavinesses of the signal caused by eccentricities of the roller.

Subsequently to the filtering and amplifying arrangement 40 the signal reaches an evaluation circuitry 43. This circuitry 43 may comprise an analog to digital converter 44 in order to convert the signal arriving as an analog one to a digital one. Thereafter, the digital signal reaches a switching stage 45, which distributes the signal to one of its outputs 45' or 45".

At the output 45' lies a memory RAM driven by a clock generator 46. The output 45" of the switching stage 45 forms the input of a comparator 47, whose other input is formed by the output of the memory RAM.

However, the output signals of the preamplifier 39 are also fed to a further filtering amplifier, stage 40', which comprises an amplifier with an alternating current coupling 41' and a bandpass filter 42'. If necessary, the frequencies of this filter 42' can be adjusted via an adjustment input 42".

With this filter arrangement 40', it can be seen when any irregularities, or waviness in the material on the roller 5, arise due to a worn-off doctor blade 18 on the roller 5. The signals allowed to pass by this filter arrangement 40' are conveniently fed to a rectifier stage 48, to which is connected a threshold switch 49. When the signal from the rectifier stage 48 exceeds a predetermined threshold value, i.e., when the signal changes per revolution of the roller 5 are too great, it indicates that the doctor blade 18 is worn-off and needs grinding or renewing. For this purpose, there is provided a corresponding acoustic and/or visual alarm device 50.

For a certain time, however, the signal at the rectifier stage 48 may be lying just below the threshold value of the stage 49 and, if necessary, it can be applied—as represented by broken lines—to a line 51 in order to serve as a correction value for the comparator device 22. Such a comparator device on a roller mill is described in the DE-PS-31 53 304 and serves to control the speed of the motor shaft for the draw-in rollers, which drives one or two draw-in rollers 1, 2 with a correspondingly controlled speed via a motor 10, whereas at least two further rollers 3–5 are driven by a separate motor 20. Speed of the motor 10 is controlled by a motor control circuit 24. The motor 20 operates at constant speed. A doctor blade 18 then abuts the last roller 5 in a known manner. For the draw-in rollers 1, 2 on the one hand, and the rollers 3–5, on the other hand, a respective pressure device 6 or 7 is provided, which can be actuated via a hydraulic control device 127. The pressure devices 6 and 7 serve to position, respectively, the rollers 1 and 5. The spacing between the rollers 4 and 5, and/or the relative speeds between the rollers 2 and 3, are operative to adjust a thickness of material carried by the roller 5.

As becomes apparent particularly from FIG. 2, in normal operation the respective measuring roll 32 abuts the surface of the layer of material lying on the roller 5. The determination of the exact zero point now forms a problem, i.e. that signal which is produced by the abutment of the measuring roll 32 immediately on the surface of the roller 5. For this purpose, two possibilities are represented in FIG. 1 which can be used for themselves or in the combination shown. It is apparent that the cylinders 6 and 7 effecting the roller pressure are connected via a respective pair of lines 52 and 53 to a hydraulic control device 127, which preferably essentially corresponds to the control device having a reversing valve 27 shown in the DE-PS-30 16 785. Accordingly, it is possible to switch from a normal operation condition at least to a released condition of the rollers in which the rollers are not pressed against each other. The reversal is effected by means of an electrically acting, manual control device 227 having a control lever 54.

Moreover, however, there is also provided a device 55 known per se provided for protection against dry-running. It can be designed according to the DE-OS-36 34 715, by way of example, so that the details of its function need not be explained herein. Essentially, the roller surface of the roller 2 is monitored optically with the help of the device 55, whereat the roller mill WW is automatically switched off via an output signal line 56 or 56' and the electric control device 227 if there should be no more product on the surface of the roller 2 (dry-running). Conversely, the device 55 is also controlled by the position of the lever 54 by having it switched off via a line 57, 57' when the roller mill WW is switched off manually.

The two line sections 57 and 57' or 56 and 57' are connected to each other via a selector switch 58. The selector switch 58 is connected to an output line 59, by which the switching stage 45 is controlled. Selectively, the control of the switching stage 45 can also be effected in dependency upon the output signal of the protection device against dry-running 55 and/or the position of the lever 54.

So if the roller mill WW is put into operation, i.e. if the layer of the material to be ground has not yet reached the roller 5 in the area of the measuring rolls 32, the output signal of the sensor SM is led, via the stages 39 and 40 as well as 44, first to the output 45' of the switching stage 45 and to the memory RAM and stored there. Thus, the exact zero point is determined.

But as soon as the layer has reached the measuring rolls 32, or after a pretermined period of time (for which purpose the switching stages 45 or 58 may be provided with a corresponding timer), the switching stage 45 will be commutated so that the further signals of the device SM for measuring the thickness of a layer will reach the output 45". At the same time, the memory RAM is switched into the read-off condition via the output 45', so that, on the one hand, the ACTUAL signal via the line 45" and simultaneously the zero point signal from the memory RAM is fed to the comparator 47, so that an exact comparison of the thicknesses of the layer can take place. The output signal of the comparator 47 is then fed for comparison with the signal of the nominal value transducer ds to the comparator 22. An output signal of the comparator 22 is fed via line 25 to the motor control circuit 24 to adjust, via line 26, the speed of the motor 10 for the control of the speed of the shaft EW for the draw-in rollers known from the DE-PS-31 53 304.

It is to be understood that the measuring signal from the output of the comparator 47 could also be used in a different way, e.g. for mere indication of the thickness of the layer or for control of the pressure, the temperature, the viscosity of the material to be ground, etc.

We claim:

1. A measuring apparatus for measuring thickness of a layer of pasty ground material spread over a supporting surface moving with a support velocity and said layer having a free material surface, said measuring apparatus comprising:

at least one measuring roll with a least one roll axis oriented crosswise to the direction of said support velocity, each measuring roll having a roll diameter and an outer roll surface rolling on top of said pasty layer, and each measuring roll having a contact area, wherein said outer roll surface is in contact with said free material surface which is moving with a free surface velocity corresponding to the support velocity;

at least one holding means for holding each of said roll axis at a variable distance from said supporting surface, said holding means including at least one support means allowing movement of said at least one measuring roll normal to said supporting surface at said contact area;

at least one excursion detector means for deducing a signal representative of at least one of the position and the movement of said at least one measuring roll relative to said supporting surface;

means for filtering the signal to obtain waviness of the material surface; and means for comparing an amplitude of the waviness with a threshold.

2. A measuring apparatus as claimed in claim 1, wherein said at least one holding means comprises a lever for holding said at least one roll axis, said lever being turnable around a mounting axis oriented crosswise to the direction of said support velocity, and maintaining close contact between said supporting surface and said outer roll surface by holding said roll axis parallel to said supporting surface at said contact area.

3. A measuring apparatus as claimed in claim 1, wherein said holding means comprises spring means for pressing said at least one measuring roll towards said contact area.

4. A method for measuring thickness of a layer of pasty ground material spread over a supporting surface moving with a support velocity, said layer having a free material surface, the method comprising the steps of:

sensing a deviation of a roller means with respect to said supporting surface, wherein said roller means comprises at least one measuring roll with a roll axis and with an outer roll surface rolling on top of said pasty layer and having a contact area where aid outer roll surface is in contact with said free material surface which is moving with a free surface velocity corresponding to the support velocity;

deducing a signal representative of said deviation an said thickness of said pasty layer;

filtering said signal; and extracting from said signal an actual waviness of said free material surface.

5. A method as claimed in claim 4, further comprising the steps of comparing said actual waviness with a threshold value for the waviness and indicating an actual waviness when it is higher then said threshold value.

\* \* \* \* \*